June 17, 1930. H. J. MURRAY 1,764,334
SLIDING CLUTCH GEAR SYNCHRONIZER
Filed June 22, 1927
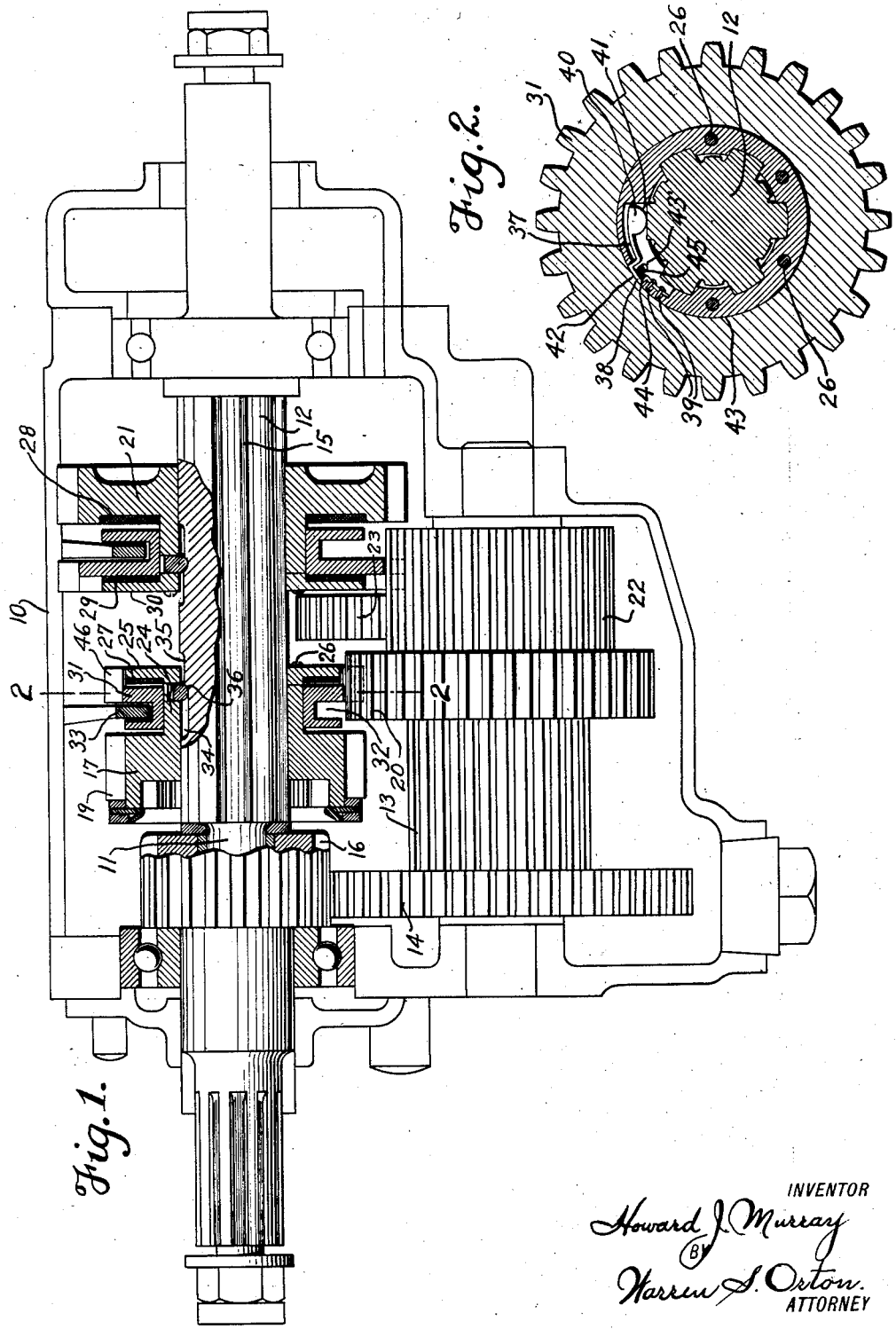
INVENTOR
Howard J. Murray
BY
Warren S. Orton.
ATTORNEY Patented June 17, 1930

1,764,334

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

SLIDING-CLUTCH-GEAR SYNCHRONIZER

Continuation of forfeited application Serial No. 548,237, filed April 11, 1923. This application filed June 22, 1927. Serial No. 200,746.

The invention relates in general to a variable speed power transmission mechanism of the gear shift type and in which the power driven gear and the load carrying gear are coordinated through the interposition of a friction clutch so that the gears will tend to assume a speed of rotation approximately equal to each other before the gears are moved into meshed position. This application constitutes a continuation of forfeited case Serial No. 548,237, filed April 11, 1923, and allowed November 27, 1926. The invention specifically relates to that type of gear synchronizing mechanism in which the actuation of a single manually operated control member moves in one direction, causes the gears to be connected together through the medium of the friction clutch and the continued movement of which control member will cause the clutch to become inoperative automatically just prior to the intermeshing of the gears in their direct driving relation.

This application is a companion to a co-pending application on a gear synchronizing device filed under even date, Serial No. 548,235. In the companion application the specific form of friction clutch selected for illustration is of the internal band type with concentrically disposed clutching members and in which the clutching movement takes place radially of the axis of rotation of the intermeshing gears. The present disclosure features the use of a different form of friction clutch which will be referred to hereinafter as a clutch of the side face type due to the fact that the clutch elements engage across a flat surface. In this case the movable element of the clutch is shiftable to and from its clutching engagement with one of the power gears in a direction axially of the shaft which carries the same.

The present disclosure features the same advantages, such as simplicity in structural design, ease of control in operating the same, positiveness of actuation and ready substitution for the corresponding gear unit in transmission casings of conventional construction as is featured in the companion application. The present disclosure has for additional objects the providing of a form of friction clutch which will provide for a maximum possible friction surface, which will provide for a uniformity of braking effect or efficiency independent of wear of the parts which will prove a form of clutch which will eliminate any necessity for adjustment of parts to obtain uniform pressure.

Another object of the invention is to provide a form of clutch connection which will be controlled in its intensity of engagement directly by the manual force of the operator in actuating the shifting levers. Still another object is to provide a synchronizer of the type outlined in which the clutching action may be effected by the initial movement of the shifter levers and while the gears are running idle and in which the parts function in present sequence and with proper lapsed time to effect the frictional connection between the synchronizer and its co-related gear before the power gears are moved into intermeshing relation irrespective as to how rapidly the operator may move the control levers.

A further object of the invention is to provide a simple means differing from the means shown in the copending application for insuring the proper meshing of the synchronizer gear with the corelated power gear without danger of stripping the teeth of either gears.

Still another object of the invention is to provide a simple adjusting means for varying the intensity of engagement between the synchronizer clutch and its coacting parts so as to compensate for wear.

Various other objects and advantages of the invention will be in part obvious from an inspection of the accompanying drawings and in part will be more fully set forth in the following particular description and one form of mechanism embodying my invention, and the invention also consists in certain novel features of construction and combination of parts hereinafter set forth and claimed.

In the accompanying drawings:—

Figure 1 is a sectional view taken axially of the power shafts through a transmission casing of conventional form, equipped with a preferred embodiment of the inventive features herein disclosed, and also constituting a modified form of the inventive features disclosed in the above identified application; and Figure 2 is an enlarged transverse sectional view taken on the line 2—2 of Figure 1.

The gear unit 17 is provided with external teeth 19 hereinafter referred to as a driven gear and adapted when meshed with a gear 20 keyed to the countershaft and hereinafter referred to specifically as a driving gear, to obtain second speed. Another gear 21 keyed to and slidably mounted on the shaft portion 15 is designed in one shifted position to mesh with a gear 22 on the countershaft to obtain first speed and in another shifted position to mesh with an intermediate gear 23 to obtain reversed speed.

In the following description particular reference will be made to the synchronizing of gears 19 and 20 but it will be understood that the invention with obvious mechanical changes can be adapted for use in other locations and as an illustration of one such use reference is made to the first speed and reverse speed synchronizing arrangement shown at the right side of Figure 1. The shiftable gear unit 17 herein illustrated is provided with a reduced sleeve extension 24 which constitutes a hub providing a circular bearing for the synchronizer. An end plate 25 is secured to the end of the hub and is fastened thereto by means of long bolts 26. The end plate is provided on the side facing the hub with a radially extending bearing face 27 designed to constitute one element of a friction clutch of the side face type.

It will be noted in connection with the showing of gear 21 where the clutching is effected incidental to the shifting of the synchronizer in both directions, that the gear itself is provided with a friction clutching face 28 facing the clutching face 29 carried by the end plate 30.

The hub 24 provides a bearing for the synchronizer herein featured and this synchronizer includes a synchronizer gear 31 mounted for rotary movement on the hub and having a width slightly less than the length of the hub so that the gear is free to slide for a limited movement on the hub and from its clutching engagement with the friction face 27. The synchronizer gear is a spur gear of ring form and is provided with a peripheral groove 32 into which extends a yoke arm 33 actuated by the usual control rod (not shown).

The portion of the shaft on which the sliding gear moves is provided on one side thereof with a pair of recesses 34 and 35 opening one into the other longitudinally of the shaft, with the recess 34 of greater depth than the recess 35 and with the end of the recess 34 rounding into the recess 35 to form a stop shoulder 36. The portion of the hub which slides over the recesses is cut-away as shown at 37 and a combined spring stop and friction brake 38 hereinafter referred to as a locking cam is positioned in the recess. This locking cam is a spring strip which extends circumferentially about the shaft portion 15 and is secured at one end to the shiftable gear 17 by screws 39. The opposite, free end of the spring is provided with a rounded projection 40 forming a cam stop held by the spring in bearing engagement with the shaft and projected into the recesses as the sliding gear is moved along the shaft. The portion of the stop 40 engaging the recesses is rounded as indicated at 41 so as to easily ride up the incline forming the shoulder 36 in its movement from one recess into the other. The locking cam is bent intermediate its length to form a squared offset portion 42 which provides a relatively extensive bearing surface for engaging the inner periphery 43 of the synchronizer gear as shown more particularly in Figure 2. It will be understood that the parts are so proportioned that when the cam stop is in the deeper recess 34 the bearing portion 42 is fully removed from engagement with the synchronizer gear and even when the cam stop is in the shallower recess 35 the synchronizer gear will be free to rotate on the bearing hub. When the cam stop is moved onto the unrecessed portion of the shaft the squared portion of the locking cam will be in tight binding engagement with the synchronizer gear thus locking the same so as to rotate with the shaft and with the sliding gear unit 17. While the cam stop is moving along the recess 35 the synchronizer gear is idle so as not to hold the power gears at the instant they are moving into their meshing position.

For the purpose of compensating for wear of the locking cam and the portion of the synchronizing gear against which it bears an adjusting device 43' is provided. In the illustrated showing this is in the form of a small cam 44 adapted to be rotated by the turning of a rod 45 and designed to bear on the underside of the offset portion 44 and thus adjust the same relative to the inner periphery of the synchronizing gear.

In the device as thus far described, and also in the form of the invention disclosed in the above identified application, it is intended that the synchronizer gear be at all times in such position relative to the driving gear 20 that it can be moved into meshing relation without danger of stripping the teeth of either gear. This may be effected either by beveling the edges of the teeth of the synchronizer and driving gears so that they will easily mesh when brought into intermeshing position, or by connecting the synchronizer gear to the driven shaft even when the synchronizer gear is in its idle position as shown in Fig. 1. It is suggested herein that the teeth of the synchronizer gear be extended to overlap the end plate 25 so that the extended teeth portion 46 will at all times be positively in mesh with the teeth at the gear 20. This has the additional advantage in that it will eliminate changes in the design of conventional forms of transmission due to varying dimensions and positions of the power gears and, also in some forms of transmissions, it will be possible to eliminate the necessity of the locking cam herein disclosed.

In operation and assuming that it is desired to move the gears 19 and 20 from their unmeshed position shown in Figure 1 into their fully meshed position as is usual in providing for second speed drives, the control rod is moved to shift the yoke 33 to the right. It will be noted that when the gears 19 and 20 are in their normal unmeshed position, the cam stop is in the deeper recess and that the synchronizer gear is in meshing engagement with the driving gear but is free to rotate on the driven gear unit 17. The initial movement of the control lever shifts the synchronizer gear slightly and thus into clutching engagement with the shiftable gear by bearing on the face 27. The normally free shiftable movement of the unit 17 is retarded by the engagement of the cam stop against the shoulder 36 at the end of the deep recess. There is thus provided a friction drive between the driving and driven power gears and this will cause the gears to be jerked approximately into the same speed during the instant of time that the cam stop is riding along up out of the deeper onto the shallower recess. With the continued movement of the shift lever the pressure acting through the synchronizing gear onto the shifting gear will overcome the holding resistance of the locking cam and thus permit the shifting gear unit to move its gear 19 into meshing engagement with the relatively fixed gear 20. During this time the shifting yoke pressing on the synchronizer gear in effecting its axial movement will have no effect on the synchronizing gear in so far as its freedom of rotary movement is concerned. As the sliding unit is moved along, the gears are fully meshed and by this time the cam stop has ridden out of the shallower recess onto the unrecessed part of the shaft. This has the effect of causing the locking cam to bear against the synchronizer gear and thus locks the same so as to rotate with the shaft. This takes place before the synchronizer gear leaves the driving gear 20 and hence the synchronizer gear slides off and remains in proper angular relation to mesh with the driving gear on the return movement.

By means of the form of clutch herein disclosed it is possible to obtain a directly applied manually controlled pressure between the faces of the clutch and any desired intensity of frictional engagement may be attained by the sensitive control of the shift levers. It is appreciated that the utilizing of a friction clutch of the side face type provides the maximum possible friction surface within the narrow structural limits provided by a device of the character under discussion. The movement of the friction clutch into operative position is attained with a minimum movement of the shift lever and is effected immediately upon the movement of the shift lever in its normal operation of shifting the gears. There is provided a uniformity of braking effect or efficiency and this is maintained independent of wear and of course eliminates any necessity of adjustment to obtain uniform pressure as the parts wear away. The maintaining of the synchronizer gear permanently in mesh with the driving gear eliminates any possibility of stripping of gears and confines all strains to the friction clutch point of the drive.

By means of the adjusting feature herein disclosed it is possible to obtain a nicety of adjustment between the locking cam and the synchronizer and in this way wearing of the parts is readily compensated.

While I have shown and described and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a power transmission, the combination with a driving shaft and a driven shaft provided with a recess, a countershaft geared to the power shaft and provided with a power gear fixed thereto, a gear unit slidably mounted on the part of the driven shaft having the recess, said unit including a power gear adapted to mesh with the power gear on the countershaft and having a hub with a radially extending bearing face projecting therefrom, a synchronizer gear mounted for rotary movement on the hub and provided with a bearing face adapted to contact with the face on the hub to form a friction clutch, a spring controlled locking cam carried by the sliding gear unit and controlled by the movement of a part of same into and out of said recess to interpose a resistance to the free sliding movement of the unit while functioning as part of the friction clutch and for locking the synchronizer gear to the driven shaft.

2. In a device of the class described, the combination of a shaft having a pair of recesses disposed longitudinally, said recesses being of different depths and opening into each other, a sliding gear unit keyed to the shaft to rotate therewith, a synchronizer gear mounted on said unit for rotary movement about the axis of said shaft, said synchronizer gear and said unit provided with means relatively movable axially and constituting the coacting elements of a friction clutch, a spring controlled locking cam including a cam stop adapted to ride into said recesses and controlled thereby when in the deeper of the two recesses to interpose a resistance to the free sliding movement of the unit while functioning as the relatively fixed element of the friction clutch and when in the shallower of the recesses to permit the synchronizer to run idle and when on the unrecessed part of the shaft cause the locking cam to bear on the synchronizer gear to cause the same to rotate with the unit and shaft and a control engaging the synchronizer gear for shifting the same into its clutching position and acting therethrough for shifting the unit on the shaft and thus causing the locking cam to function.

3. In a gear transmission, the combination of a pair of power transmitting shafts provided with gears relatively movable to and from a meshing position, one of said gears shiftable axially on its shaft, a synchronizer carried by said shiftable gear, a friction drive between the synchronizer and said shiftable gear to cause them to rotate together, locking means between the synchronizer and shaft and a control movable in one direction for effecting in sequence a movement of the synchronizer into clutching engagement with the sliding gear, a movement of the shiftable gear into mesh with the other gear and a movement of the locking means into operative position.

4. In a device of the class described, the combination of a shaft provided with a recess, a power gear fixed thereto for rotary movement and slidable thereon axially across said recess, said gear constituting an element of a friction clutch, a synchronizer gear mounted on the power gear for rotary movement and free to move axially into engagement therewith to constitute the coacting element of the friction clutch and means controlled by the position of the power gear relative to the recess for affecting a coupling of the synchronizer with the shaft so that the synchronizer will rotate with the shaft and means for shifting the power gear together with the synchronizer along said shaft.

5. In a gear transmission, the combination of a shaft, a power gear slidable thereon to and from a meshing position and constituting one element of a friction clutch, a synchronizer constituting the coacting element of the clutch, a shift rod operatively connected to the synchronizer to effect a clutching engagement between the synchronizer and the power gear on the initial part of its movement in shifting the power gear into its meshing position and a locking cam controlled by the position of the power gear on the shaft for connecting the synchronizer and shaft.

6. In a device of the class described, the combination of a relatively fixed gear, a relatively shiftable gear adapted to mesh with the fixed gear, a synchronizer gear, means for connecting the synchronizer gear to the shiftable gear to effect a friction drive therebetween, and means for connecting the synchronizer gear to rotate with the fixed gear, and a shiftable control member bearing on the synchronizer gear to move the same into bearing engagement with the shiftable gear.

7. In a device of the class described, the combination of a pair of power transmitting gears adapted to be moved to and from an intermeshing position, one of said gears provided with a clutch surface, a synchronizing gear mounted for free rotary movement on said gear, and adapted to be moved into meshing engagement with the other power gear, said synchronizing gear adapted to be moved axially into clutching engagement with said clutch surface thereby to provide a friction drive between the synchronizing gear and the power gear on which it is mounted and manually actuated means directly engaging the synchronizer gear for controlling the intermeshing relation of the power gears and for controlling the pressure between said clutch surface and the synchronizing gear.

8. In a device of the class described, the combination of a pair of power transmitting gears, one of which is slidable axially to and from its meshing position with the other gear, a synchronizing gear mounted for free rotary movement on the slidable gear and adapted to mesh with the other power gear and otherwise normally independent of said other gear, said synchronizer gear adapted to coact with the gear on which it is mounted to form a friction clutch and manually actuated control means operatively connected directly to the synchronizer gear to effect in sequence the movement of the synchronizer gear axially into its frictional engagement with its associated power gear and then to slide both the synchronizer gear and its associated power as a unit relative to said other power gear.

9. In a gear transmission, the combination of a shaft, a power gear slidable thereon to and from a meshing position and constituting one element of a friction clutch, means for restraining the freedom of axial movement of the slidable gear on its shaft, a synchronizer constituting the coacting element of the clutch, a shift rod operatively connected to the synchronizer to effect a clutching engagement between the synchronizer and the power gear on the initial part of its movement in shifting the power gear into its meshing position.

10. In a device of the class described, the combination of a pair of power transmitting gears relatively movable to and from an intermeshing position, a synchronizer for causing the gears to approach the same speed, said synchronizer including a synchronizer gear carried by one of the power gears and free to turn thereon, the synchronizer gear and the power gear carrying the same having a limited freedom of relative movement axially and coacting to provide a friction clutch drive operably independent of the other gear.

11. In a device of the class described, the combination of a relatively fixed gear, a relatively shiftable gear restrained in its axial movement adapted to be moved forcefully into mesh with the fixed gear, a synchronizer gear normally disposed in mesh with the fixed gear and means for shifting the synchronizer gear axially of the shiftable gear and into a frictional driving relation with the same while restrained from axial movement.

12. In a device of the class described, the combination of a power shaft, a power gear fixed thereto for rotary movement and adapted to be moved axially along the same, means controlled by the position of the gear on the shaft for resisting the axial movement of the gear, a synchronizer gear mounted on the power gear for rotary movement and slidable axially to and from a frictional engagement therewith and a control directly engaging the synchronizer gear for shifting the same into frictional clutching engagement with the power gear and for acting therethrough to shift the same along the shaft.

13. In a gear transmission, the combination of a shaft, a power gear slidable thereon to and from a meshing position and constituting one element of a friction clutch, a synchronizer constituting the coacting element of the clutch, a shift rod operatively connected to the synchronizer to effect a clutching engagement between the synchronizer and the power gear on the initial part of its movement in shifting the power gear into its meshing position and means for interposing a resistance to the free slidable movement of the power gear on the shaft thereby to permit the friction clutch to become effective.

14. In a device of the class described, the combination of a shaft, a pair of power transmitting gear, one of which is shiftable on said shaft to and from an intermeshing engagement with the other gear, a synchronizer gear mounted for rotary movement on the shiftable gear and normally in mesh with said other power gear, said synchronizer gear and said shiftable gear provided with clutching means coacting to provide a friction drive between the same, said synchronizer gear provided with a bearing surface and a shifter member adapted to be moved into bearing engagement with said surface to effect said friction drive.

15. In a device of the class described, the combination of a pair of gears, one of which is shiftable axially to and from a meshing engagement with the other gear, a synchronizer gear provided on one side with a clutch face adapted to engage one side of the shiftable gear to provide a friction drive therebetween, and a control directly engaging the synchronizer for effecting the clutching of the synchronizer gear with the shiftable gear and for effecting a sequential meshing of the said pair of gears.

16. In a device of the class described, the combination of a pair of gears, one of which is movable axially to and from a meshing engagement with the other gear, a synchronizer having a limited freedom of axial movement into clutching engagement with one of the gears and adapted to mesh with the other gear when moved axially relative thereto and normally otherwise independent of said other gear and resilient means tending to restrain the freedom of axial movement of the gear which clutches with the synchronizer.

17. In a device of the class described, the combination of a relatively fixed gear, a shiftable gear adapted to mesh therewith, a synchronizer gear mounted for rotary and longitudinal movement on the shiftable gear, said shiftable gear provided with an end piece adapted to coact with the synchronizer gear to form a friction clutch drive between the same, said synchronizer gear having its teeth overlapping said end piece and adapted to mesh with the fixed gear and means for shifting the synchronizer into engagement with the end piece and to shift the shiftable gear into mesh with the fixed gear.

18. In a device of the class described, the combination of a pair of gears, movable relative to each other to and from a meshing position, a synchronizer carried by one of the gears and adapted to mesh with the other gear, a locking cam for connecting the synchronizer and its carrying gear in inter-driving relation and means for adjusting said locking cam thereby to compensate for the wearing away of the same.

19. In a device of the class described, the combination of a shaft, a pair of power transmitting gears, one of which is shiftable on said shaft to and from an intermeshing engagement with the other gear, a synchronizer gear mounted for rotary movement on the shiftable gear and adapted to mesh with said other power gear, said synchronizer gear and said shiftable gear provided with clutching means coacting to provide a friction drive between the same, and means engaging said synchronizer gear to shift the same into and from its driving engagement with its coacting gear.

20. In a device of the class described, the combination of a shaft provided with a recess, of a gear unit slidable on the shaft, a synchronizer gear mounted on the unit for rotary movement, a locking cam controlled by the position of the unit relative to the recess for securing the synchronizer gear to rotate with the unit and shaft and manually actuated means for adjusting the locking cam.

21. In a device of the class described, the combination of a shaft provided with a recess, of a gear unit slidable on the shaft, a synchronizer gear mounted on the unit for rotary movement, a locking cam controlled by the position of the unit relative to the recess for securing the synchronizer gear to rotate with the unit and shaft and means associated with the locking cam for adjusting the same thereby to compensate for wear of the cam and its associated parts.

22. In a gear synchronizing device, the combination with a pair of gears adapted to be moved to and from a meshing position, of a synchronizer movable with one of the gears for causing the gears to approach the same speed as they are moved towards their meshing position, said synchronizer including a clutch member having a friction surface on one side face thereof adapted to engage one of the gears and manually actuated means for controlling the intensity of engagement of the clutch member with the said gear.

23. In a gear synchronizer, the combination of a gear provided with a hub extension constituting a shaft, a stop fixed to the shaft, a synchronizer gear mounted for rotary and slight axial movement on the shaft, manually controlled means for pressing the gear into frictional clutching engagement with the stop, said synchronizer gear and said stop providing coacting clutch faces, one of which is formed of a friction material.

Signed at New York, in the county of New York and State of New York this 17th day of June A. D., 1927.

HOWARD J. MURRAY.